Sept. 2, 1952 G. T. LEIHGEBER 2,609,074
THROTTLE AND SPEED CONTROLS FOR MOTORS
Filed June 19, 1948 5 Sheets-Sheet 1

INVENTOR.
GEORGE T. LEIHGEBER
BY Ayres D. Stoddard
Attorney

Sept. 2, 1952     G. T. LEIHGEBER     2,609,074
THROTTLE AND SPEED CONTROLS FOR MOTORS
Filed June 19, 1948     5 Sheets-Sheet 2
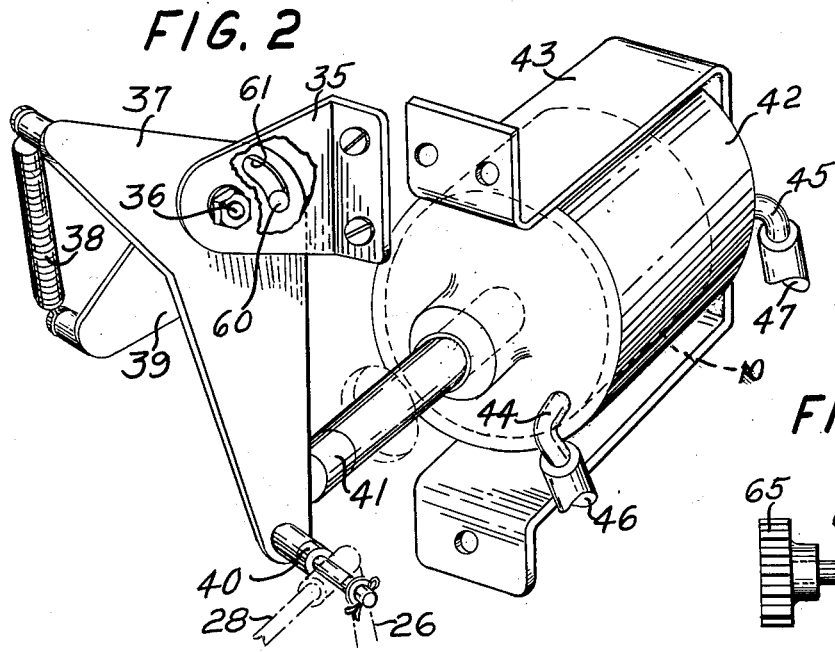
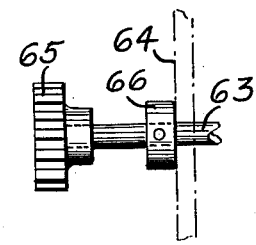
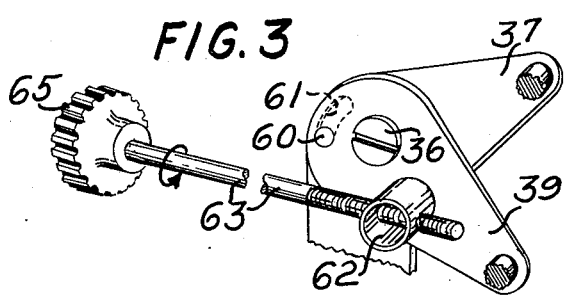
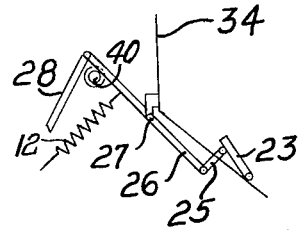
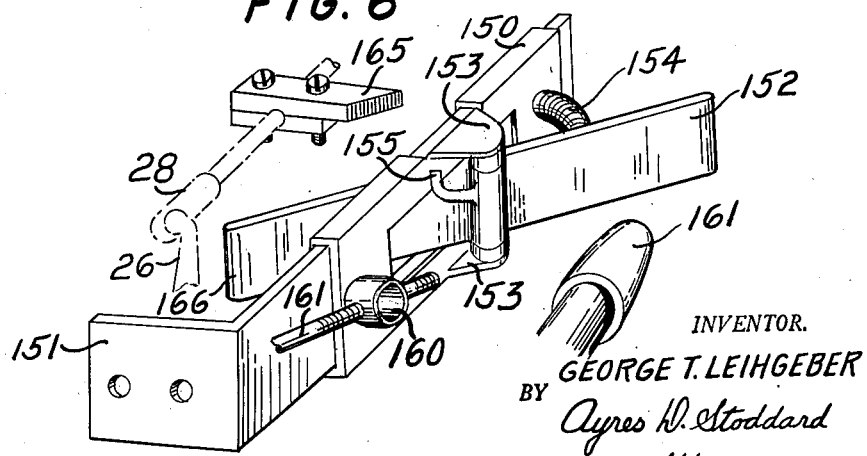
INVENTOR.
GEORGE T. LEIHGEBER
BY *Ayres D. Stoddard*
Attorney

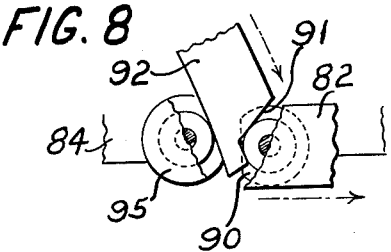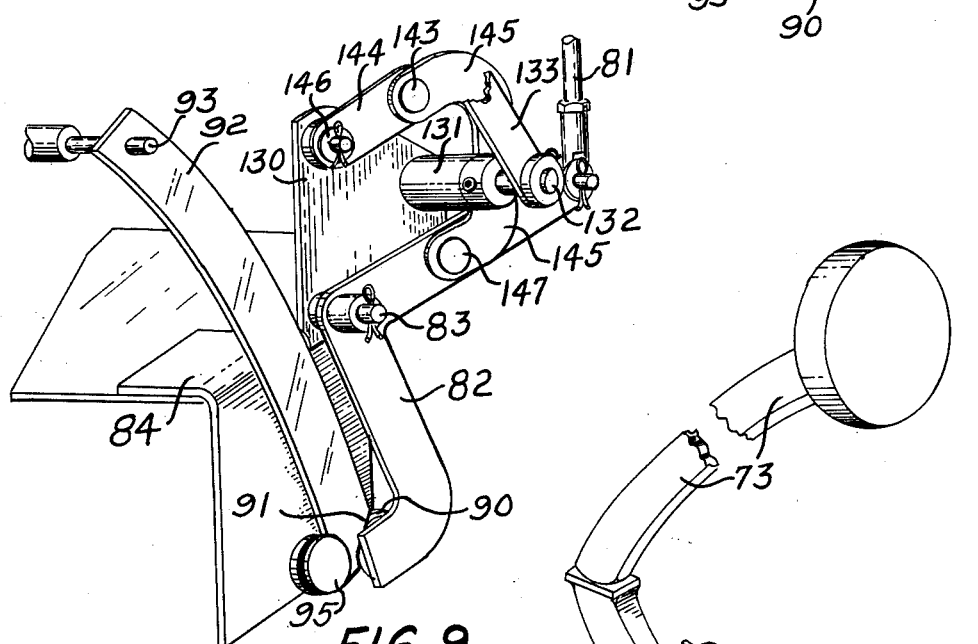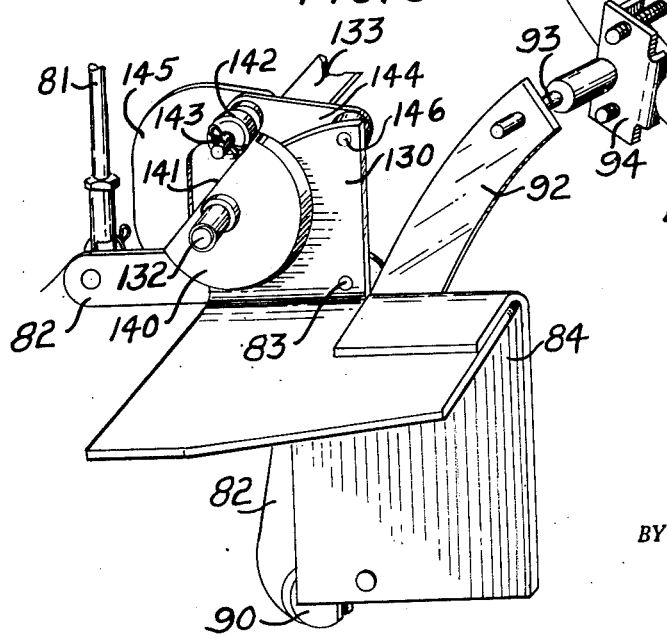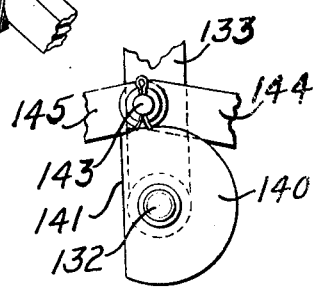

Sept. 2, 1952   G. T. LEIHGEBER   2,609,074
THROTTLE AND SPEED CONTROLS FOR MOTORS
Filed June 19, 1948   5 Sheets-Sheet 4

INVENTOR.
GEORGE T. LEIHGEBER
BY Ayres D. Stoddard
Attorney

Patented Sept. 2, 1952

2,609,074

UNITED STATES PATENT OFFICE 2,609,074

THROTTLE AND SPEED CONTROLS FOR MOTORS

George T. Leihgeber, Dayton, Ohio

Application June 19, 1948, Serial No. 34,066

12 Claims. (Cl. 192—3)

This invention relates to throttle and speed controls for motors and particularly to the control of the gasoline throttle to determine the amount of flow of gasoline to the carburetor to control the speed of an automobile.

More specifically, my invention relates to the novel throttle control whereby the driver of an automobile may set the throttle to control a constant supply of gasoline to the carburetor by changing the control of the throttle from the foot pedal to a hand manipulative member on the instrument panel, thus relieving the driver from leg tension and constant strain especially when driving on long trips. This permits the driver to take his foot off the throttle foot pedal, thus allowing the driver to move his foot and leg into other positions for resting.

A further control of the throttle is provided under the control of the brake pedal to close the throttle to idling speed when the brake is applied while the throttle is set for a relatively high driving by the hand manipulative member.

This last mentioned further control, upon operation of the brake pedal causes an automatic resetting of the throttle control into its normal foot pedal control position.

It is therefore, an object of my invention to provide a manually operable means to change the control of the gasoline throttle from the normal foot pedal control, whereby the throttle is variably operable to cause a variable amount of gasoline to be fed into the carburetor, to a normally set control whereby the throttle operation is constant, to provide a constant flow of gasoline to the carburetor.

Another object of my invention is to provide means to automatically change the throttle control from the constant control thereof to the variable control thereof upon operation of the brake pedal.

Another object is to provide a novel combination of means to control the gasoline flow to the carburetor of an automobile, including a valve means in a vacuum line, said valve means being under the control of the brake pedal at the option of the driver of the car.

Further object is to provide novel means to render the automatic control means for the gasoline inoperative, and again to render it operative at the will of the driver of the car, by the mere operation of hand operated means on the instrument panel of the car.

A still further object is the provision of a novel means under control of the gear shifting means of the car, to render the automatic control of the flow of the gasoline inoperative.

Another object of my invention is the provision of means controlled by the gear shifting means to render the control means for the gasoline flow inoperative except when the car is in high gear.

Another object is to provide novel means under the control of the gear shifting means to supercede the automatic control of the flow of the gasoline, by the brake pedal.

Another object of my invention is to so arrange and combine the gasoline control means, that when the foot throttle pedal is operated, for example to suddenly speed up the car when it is necessary to pass another car, when the driver takes his foot off the foot throttle pedal, after passing the car, the car will again assume the constant speed to which the controls were set, without the necessity of any readjustment of the hand control means.

Still another object of my invention is the provision of a novel throttle and speed control for motors, which control is readily adaptable for use with any type of fluid drives which are used in certain automobiles now on the market, and including hydromatic drives for automobiles.

With these and other incidental objects in view my invention includes other novel features and combinations of elements, all of which will appear in the detailed description to follow, and all of which are illustrated in the drawings, of my preferred modified forms of my invention.

Of said drawings:

Fig. 2 is a perspective view of a portion of the mechanism for controlling the constant amount of flow of gasoline to the carburetor.

Fig. 3 is a perspective view of the means for manually adjusting the control means of Fig. 2.

Fig. 4 is a side elevation showing the mounting of the manual adjusting means in the instrument panel.

Fig. 5 is a diagrammatic view showing how the foot throttle actuates the carburetor control valve.

Fig. 6 is a perspective view of a modified form of the mechanism of Fig. 2.

Fig. 7 is a perspective view of the means operated by the movement of the brake pedal towards the braking position, to render the automatic throttle control inoperative by actuating the control valve for the vacuum cylinder.

Fig. 8 is a detail of a part of the brake operated means for actuating the valve control.

Fig. 9 is a perspective view showing the brake pedal and its connection to the control valve actuating means, and also shows the means operated by the gear shifting lever rod to control the effectivity of the automatic throttle control mechanism.

Fig. 10 is a side elevation of the gear shift lever controlled means in the neutral position.

*Detailed description*

Figure 1:
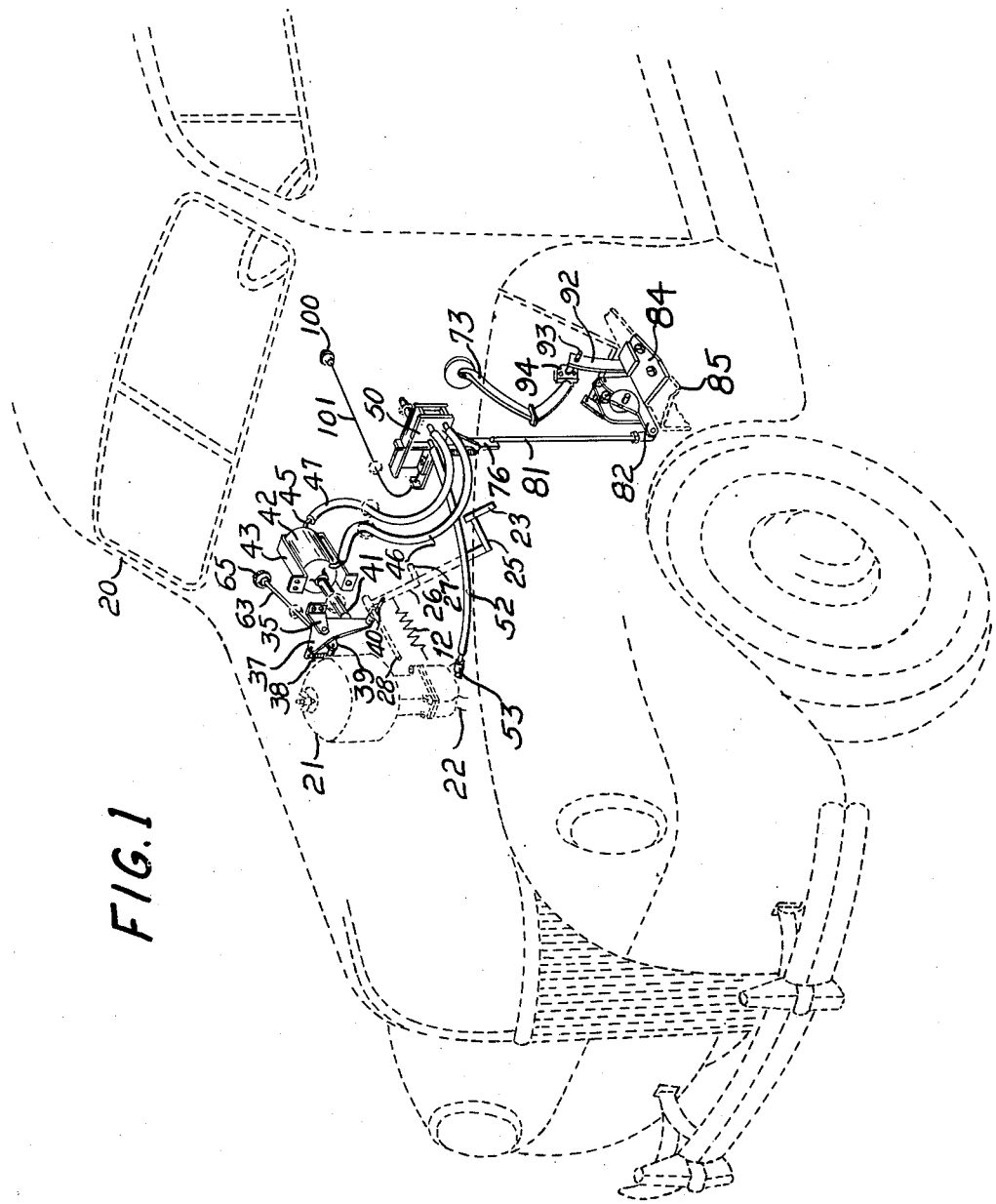
Fig. 1 is a phantom perspective of a part of an automobile showing the relative locations of my automatic control means for the control of the flow of gasoline to the carburetor.

A portion of an automobile 20 is shown in dotted lines in Fig. 1 as is the carburetor 21 and intake manifold 22. To control the carburetor gasoline valve in the normal manner the operator steps on a foot throttle 23 (Fig. 5) mounted on the floor board 24 which moves a link 25 down and rocks a throttle lever 26 pivoted at 27, clockwise thus moving a carburetor throttle rod 28 towards the right. In Fig. 1 the lever 26 is shown with its spring 12 connected to it, the other end of the spring being anchored to a stationary part of the vehicle so that upon the rocking of the lever 26 by the foot throttle 23, the spring 12 is put under tension as the lever moves the control rod 28 to the right, to cause the throttle valve in the carburetor 21, to be opened. When released, the spring returns the rod 28 towards the left as will be later described. Such movement of the throttle rod 28 causes a variable amount of gasoline to be fed into the carburetor depending upon how far the operator presses the foot throttle 23. When the driver of the car releases the throttle 23, then the tensioned spring 12 restores the throttle rod 28 to the left (Figs. 1 and 5) to close the throttle valve to shut off the gas supply in the usual manner.

I have provided a novel means to set the throttle control rod 28 in any of several definite positions to maintain a constant speed of the car by feeding a constant amount of gasoline to the carburetor. This is shown in Figs. 1, 2 and 3.

Figure 11:
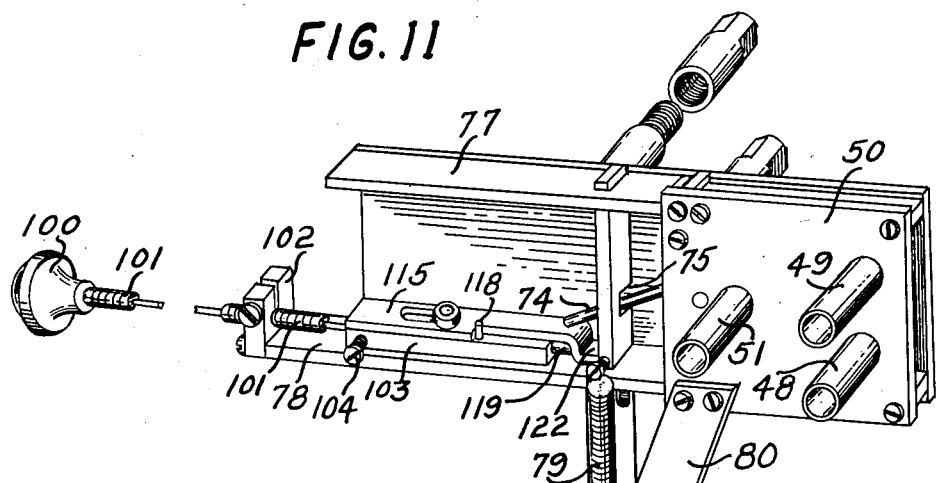
Fig. 11 is a perspective view of the brake controlled means to actuate the control valve to determine the effectivity of the automatic throttle control, and also shows a manually operated means to permit the automatic throttle control to be operable, and to render said automatic control inoperative.
Figure 13:
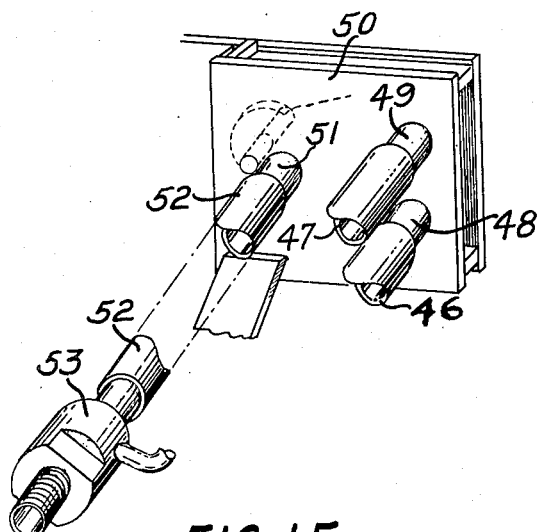
Fig. 13 shows the outside of the automatic throttle control valve.

Secured to the front side of the usual dashboard 34 (shown diagrammatically in Fig. 5) is a bracket 35 having pivoted thereto, by means of a bolt 36, a throttle control lever 37 the upper end of which is connected by a strong spring 38 to a throttle control arm 39 also pivoted on the bolt 36. Secured to the lower part of the arm 37 is a shouldered stud 40, the smaller section of which normally contacts the under side of the upper portion of the throttle lever 26 as shown in Fig. 5. A ram or piston rod 41 is connected to the usual piston 10 in a vacuum cylinder 42, which constitutes a fluid motor. The rod 41 contacts the rear side of the lever 37 when the automatic gasoline control is inoperative and holds the stud 40 in the position shown. This cylinder 42 is supported by a bracket 43 secured to the rear side of the dash-board 34. Front and rear ports 44 and 45 respectively are connected by flexible tubes 46 and 47 to lower and upper ports 48 and 49 respectively, (Figs. 1, 11 and 13) of a control valve 50 carried on the front side of the dash-board 34. The control valve 50 has a vacuum intake port 51 connected by a flexible tube 52 to a port 53 of the carburetor intake manifold 22.

As above stated the throttle control lever 37 and control arm 39 are shown in their normal positions with the spring 38 under sufficient tension to hold the lever 37 against the ram 41.

The arm 39 carries a pin 60 projecting into a curved slot 61 in the lever 37 and concentric with the center of the bolt 36. Also secured to the control arm 39 is a hollow stud 62 having a transverse threaded hole to receive the threaded end section of a manipulative throttle adjusting rod 63 (Fig. 4) and having a serrated knob 65 secured to the end thereof. A collar 66 secured to the rod 63 prevents any forward movement of the rod 63 and consequently any clockwise movement (Figs. 1 and 2), or counter-clockwise movement (Fig. 3) of the lever 37 and arm 39.

When driving the automobile in the normal manner, using the foot throttle 23, the depression of the latter rocks the lever 26 and moves the carburetor throttle rod 28 rearwardly a distance depending upon the travel of the foot throttle by the operator, to control the feed of gasoline to the carburetor and consequently to control the speed of the automobile.

To relieve the driver from leg strain when traveling, the throttle rod 28 may be moved a definite distance and held in any predetermined position desired by the driver so as to cause a constant feed of gasoline to the carburetor without the necessity of holding the foot throttle 23 down with the driver's foot.

Such control is accomplished by turning the knob 65 clockwise, as shown by the directional arrow in Fig. 3. Such turning of the knob 65 causes the threaded section of the rod 63 by its turning movement in the hole of the stud 62, which hole as above stated is threaded, to rock the arm 39 clockwise (Fig. 3), counter-clockwise (Figs. 1 and 2) and move the pin 60 upwardly in the curved slot 61 of the throttle control lever 37 and at the same time, put an extra load or stretch in the spring 38, because the lever 37 cannot move due to its contact with the ram 41 at this time.

Now, as the motor starts a vacuum is created in the manifold 22 which is transmitted by the tube 52 to the valve port 51 of the valve 50. This valve 50 has a control arm 70 (Fig. 4) pivoted at 71. The arm 70 has a T-slot 72 which is open on the valve port side only, to transmit the vacuum from the port 49 to the port 48 and vice versa, depending upon the position of the arm 70, which position is automatically controlled by means to be later described. The arm 70 has a snug sliding fit between the front and rear plates of the valve 50.

With the valve arm 70 in the upper position (Fig. 14) the vacuum is transmitted from the port 51 to the vertical section of the slot 72, through the horizontal part thereof to the port 49, thence through the tube 47 to the rear port 45 of the vacuum cylinder 42, thus causing the ram 41 to be pulled into the cylinder 42 and away from the rear of the throttle lever 37, whereupon the loaded spring 38 rocks the lever 37 counter-clockwise (Fig. 2), clockwise (Fig. 3) until the bottom of the curved slot 61 contacts the pin 60 of the control arm 39. Therefore, the pin 40 by its contact with the lever 26 moves the throttle rod 28 to a definite position, determined by the turning movement of the knob 65 so that a constant amount of gasoline will now be fed to the carburetor to control the motor speed to cause the automobile to travel at a constant speed, without the driver having to hold his foot on the foot throttle.

As above stated, the control of the constant amount of gasoline fed to the carburetor and the consequent constant motor speed, and the speed of the automobile may be varied depending upon the variable setting of the pin 60 by the knob 65.

It is highly desirable and necessary to reduce the motor speed when the brake is applied to slow down the speed of the automobile and/or to stop the automobile. Therefore, I have provided an automatically operated means to automatically restore the throttle control lever 37 to normal position whenever the brake is applied, even to a very slight degree, whereupon the spring 12 returns the throttle rod 28 to the left (Figs. 1 and 2) to shut off the supply of gas from the carburetor.

Such automatic restoration of the control lever 37 is effected by controlling the valve arm 70 from the usual brake pedal 73. The valve control arm 70 has a pin 74 (Figs. 11 and 14) projecting into a notch 75 of a bar 76 slidably mounted in the bars 77 and 78 rigidly secured to the back plate of the valve 50. A spring 79 stretched between a screw stud on the bar 76 and a toe of a plate 80 secured to the valve 50 exerts a downward pull on the bar 76, thus, through the pin 74, holding the arm 70 in the position shown in Fig. 14. The bar 76 is connected to a thrust rod 81 pivotally connected to a lever 82 (Figs. 1 and 7 to 9) in turn pivoted on a stud 83 carried by a bracket 84 secured to the automobile frame 85 (Fig. 1). The lever 82 carries a grooved roller 90 cooperating with a cam surface 91 of an arcuate bar 92, the upper end of which is connected to the brake pedal 73 by a pin 93 and a clamp 94 secured to the brake pedal 73. The bracket 84 carries a grooved guide roller 95 cooperating with the bar 92.

From the above description it can be clearly seen that when the automobile is being controlled as to speed of the motor and driving speed, should the driver press the brake pedal 73 it will move the bar 92 downwardly between the grooved rollers 90 and 95. Since the roller 95 is carried by the stationary bracket 84, the cam surface 91 rocks the lever 82 until said surface passes beneath the roller 90, thus moving the thrust rod 81 upwardly which raises the bar 76 and rocks the valve arm 70 clockwise, from the full line position into the dotted line position of Fig. 14. Therefore, the vacuum is directed from the port 49 to the port 48 and thence by the tube 46 to the front port 44 of the cylinder 42 thus pulling the ram 41 from its inner position into its outer position (Fig. 2) whereupon said ram 41 restores the throttle lever 37 to its normal position, thus permitting the throttle rod 28 to move forward under action of the spring 12 to reduce the flow of gasoline to the carburetor.

Such movement of the lever 37 stretches the spring 38 and does not affect the setting of the arm 39. Therefore, when the driver releases the brake pedal 73 the spring 79 restores the bar 76, downwardly which rocks the valve control arm 70 back to its full line position (Fig. 14) whereupon the vacuum then is through the port 49, tube 47 to port 45 of the cylinder 42 and consequently the ram is pulled into the cylinder and the spring 38 simultaneously resets the control lever 37 as determined by the previous setting of the arm 39 under control of the hand knob 65.

To render the automatic control valve 50 inoperative and consequently the automatic control of the gasoline feed inoperative upon depression of the brake pedal 73, the driver of the automobile pushes a button 100 (Fig. 11) to the right. This restores the throttle control to normal condition.

Figure 18:
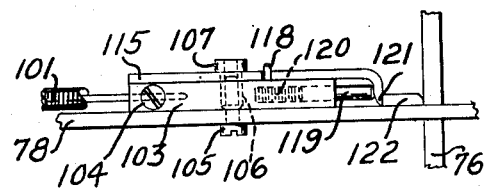
Fig. 18 is an elevation of the details of the valve control means.

This button 100 is connected to a flexible rod 101 guided by the instrument panel 64, the dashboard 34 and a block 102 secured to the valve support bar 78. The end of the flexible rod 101 projects into a slidable block 103 and is held therein by a screw 104. This block 103 is guided by a pilot screw 105 (Fig. 18) screwed into a guide sleeve 106 secured to a collar 107.

Figure 15:
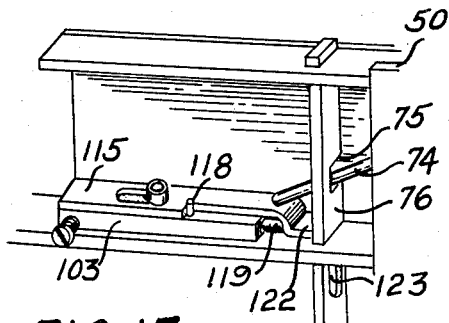
Fig. 15 shows the control of the means for actuating the throttle control, control valve in position to permit operation of the valve, said valve being in the operating position.
Figure 16:
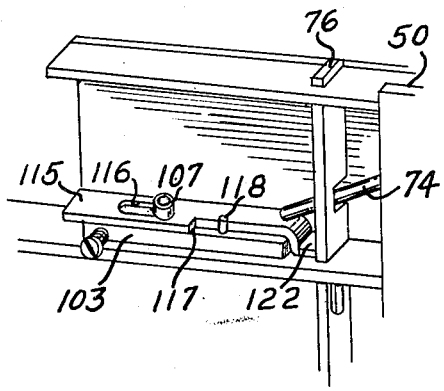
Fig. 16 shows the same means in position to be moved to hold the valve in operating position upon operation of the brake pedal towards braking position.
Figure 17:
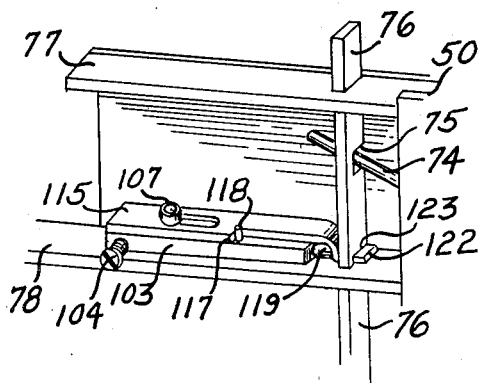
Fig. 17 shows the details of the means adapted to hold the valve in inoperative position.

Slidably mounted on top of the block 103 is a latch plate 115 having a slot 116 to receive the sleeve 106. The latch plate 115 is narrowed to form a shoulder 117 which normally contacts a pin 118 in the block 103 to prevent movement of the latch plate 115 to the right when the button 100 is in its normal position, which also holds the block 103 in its normal position. This block 103 carries a plunger 119 pressed by a spring 120 against a bend 121 of the latch plate 115. A lip 122 formed by the bend 121 is adapted to enter a hole 123 in the control bar 76 when the bar is in its upper position and when the button 100 has been moved to the right to move the block 103 from the position shown in Figs. 11, 15 and 18 to the position shown in Figs. 16 and 17.

This lip 122 is moved into the hole 123 by the plunger 119 under the load placed in the spring 120 by movement of the block 103. The latch plate 115 when snapped or moved by the spring plunger 119 assumes the position shown in Fig. 17, thus holding the control bar 76 up, and through the pin 74, holding the valve control arm 70 in the position shown in dotted lines in Fig. 14, which as stated above causes the ram 41 (Fig. 2) to be pulled to, and held in the position shown in Fig. 2 to restore the throttle control lever 37 to normal position to permit the throttle rod 28 to move forward to stop the flow of gasoline to the carburetor when the driver's foot is off the foot throttle pedal 23.

Thus the automatic control of the gasoline flow may be manually rendered inoperative by manipulation of the button 100 when desirable or necessary.

Figure 14:
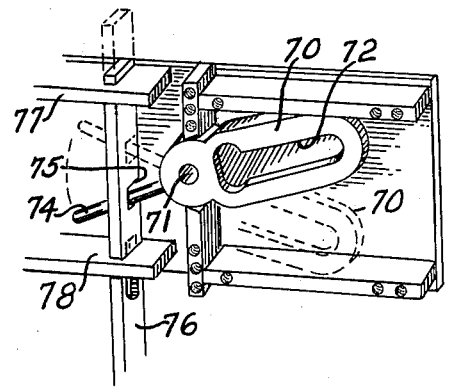
Figure 14 shows the inside of the automatic throttle control valve, and the means for actuating it.

To again render said automatic control adaptable for operation the driver pulls the button 100 out to its normal position thus restoring the block 103 and through the pin 118, the latch plate 115 withdraws the lip 122 from the hole 123 in the bar 76, whereupon the spring 79 restores the bar 76, upon release of the brake pedal 73 to normal, to move the valve control arm 70 back to its full line position shown in Fig. 14, which is its normal position.

One of the main and novel features of my invention is the fact that the entire automatic control of the gasoline feed is under control of the gear shifting means. When the car is in high gear is the only time that the automatic mechanism above described can function. When the gear shifting means is in neutral position or in second position, or second gear, the entire automatic control of the gasoline feed is inoperative. Likewise when the gear shifting means is in low gear or in reverse gear positions, then the gear shifting means has absolutely no effect upon the automatic control of the gasoline feed. That is, the automatic feature of gasoline feed control cannot function when the car is in low gear or in reverse gear.

Such novel feature and the controls described render my invention readily adaptable for use in automobiles that use fluid drive means of various types, such as the hydromatic drives of certain automobiles.

This type of novel control described is also very useful when driving and the driver wishes to pass a car. All the driver has to do is to step on the foot throttle lever 23 and feed more gasoline to the carburetor to suddenly speed up the car in order to pass another car. When the driver is a safe distance in front of the car he has just passed he releases the foot throttle lever 23 and the car will then again assume the speed at which the car was running prior to the passing of the car on the road. This is due to the fact that the control lever 39 will again automatically assume the position to which it was set by the knob 65 when the driver decided to drive at a constant speed by using the gasoline control means above described, the throttle rod 28 being returned by the spring 12 to its position as previously determined by the setting of the knob 65.

The mechanism controlled by the gear shifting means to supercede the control of the automatic gasoline feed by the brake pedal 73 is shown in Figs. 7, 9, 10 and 12 and will now be described.

A vertical plate 130 of the bracket 84 carries a bushing 131 which supports a shaft 132 having secured thereto an arm 133 to which is pivoted a link 134 connected by a clamp 135 to a rod 136 operated by the gear shifting means. This rod 136 is shown in the position which it occupies when the car is in high gear. When the gear shifting means is moved into second gear position the rod 136 is moved upwardly as viewed in Fig. 12. With the rod 136 in high gear position the arm 133 is in the position shown in Figs. 7, 9 and 12 and therefore a cam 140 secured to the shaft 132 is retained in the position shown in Fig. 9, whereupon a surface 141 of the cam 140 contacts a roller 142 carried on a pivot 143 which connects an arm 144 to an arm 145. The arm 144 is pivoted on a stud 146 on the plate 130 and the arm 145 is pivoted on a stud 147 on the lever 82.

It can be seen from the above description that when the car is in high gear the lever 82 will be moved by the brake pedal bar 92, as previously described, to raise the rod 81 (Figs. 11 and 12) to automatically cause the valve 50 to control the cylinder 42 to cause its ram 41 to restore the gasoline feed control lever 37 to normal whereby the spring 12 operates the rod 28 to reduce the supply of gasoline upon operation or depression of the brake pedal 73.

Figure 12:
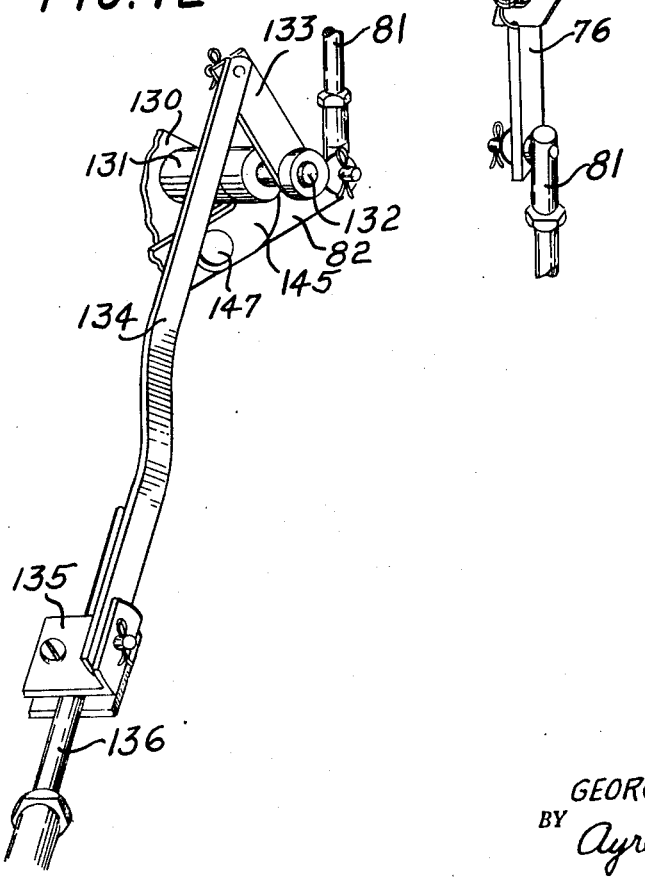
Fig. 12 is a perspective view showing the connection from the gear shift rod to the control thereby for controlling the automatic throttle control from the gear shift lever.

When the rod 136 (Fig. 12) is moved upwardly when the car is put in neutral or second gear, the link 134 rocks the arm 133 clockwise as shown in Figs. 7 and 12, counter-clockwise as shown in Fig. 9, thus moving the cam 140 from the position shown in Fig. 9 to the position shown in Fig. 10. Such movement of the cam 140, through the roller 142 rocks the arm 144 clockwise (Fig. 9), counter-clockwise (Fig. 7) whereupon, through the arm 145 the lever 82 is rocked counterclockwise (Fig. 7) to move its roller 90 out of cooperative relation with the brake pedal bar 92, and at the same time raise the rod 81 which controls the valve 50 to render the automatic control inoperative in the manner previously described.

Modified form

In Fig. 6 I have shown a modified form of a part of my invention which relates to the lever 37 and arm 39 of Fig. 2. In Fig. 6 I use a slide 150 mounted on a stationary bracket 151 secured to the dash-board 24. This slide 150 carries a lever 152 pivoted between ears 153 of the slide 150. A spring 154 holds a limit stop 155 against the side of the slide 150 to limit the clockwise movement of the slide under the action of said spring 154. The slide 150 has a hollow stud 160 with a transverse threaded hole to receive a threaded rod 161 like the rod 63. A ram 162, like the ram 41, cooperates with the right end of the lever 152, and in Fig. 6 the ram 162 is shown in its operated position, that is in the position in which it has been drawn into the cylinder 42. The lever 152 is in a position wherein it has been set by the rod 161, and which position it assumes after the ram 161 has been operated to the position shown.

The throttle lever 26 and throttle rod 28 are shown in Fig. 6, and the rod 28 has clamped to it a latch block 165, shown in the normal position. When the driver of the car steps on the foot throttle 23 the rod 28 of Fig. 6 is moved forward until the latch block 165 snaps past the end 166 of the lever 152, the spring 154 flexing to permit the lever 152 to rock until the latch block 165 is past the end 166 thereof. The lever 152 then holds the throttle rod 28 in this set position so that the car will travel at a constant speed due to the fact that the gasoline supply to the carburetor is now constant with the rod 28 being held in such position with the latch block in front of the end 166 of the lever 152.

When the ram 161 is forced back to normal position in the manner previously described in connection with the ram 41, said ram 161 contacts the lever 152 and rocks it counter-clockwise and thereby moves the end 166 of said lever 152 away from the latch block 165 whereupon the rod 28 is restored to normal as above described to reduce the flow of gasoline to the carburetor under all conditions and by the same means as previously described, when the valve control arm 70 is operated to reverse the vacuum in the cylinder 42.

Thus the modified mechanism of Fig. 6 is controlled and works to control the gasoline flow and consequently the motor and car speed in the same manner as the lever 37 and arm 39 work to control such gasoline feed and speed controls.

From the above it can be seen that by the adjustment of the slide 150 by the rod 161 varies the distance between the end 166 of the lever 152 and the latch block 165 to vary the constant of the flow of the gasoline to the carburetor. The greater the distance between the latch block 165 and the end 166 of the lever 152, the greater will be the constant of gasoline flow and therefore the greater the constant speed of the car. As the distance is cut down so is the flow of gasoline and the speed of the car.

What I claim as new is:

1. A device for actuating a speed control, including a normally ineffective fluid motor powered by vacuum created pressures, said motor being rendered effective upon operation of a vehicle motor, said fluid motor including a cylinder, a piston and piston rod, said device also including a foot pedal to actuate a throttle control rod to operate a throttle valve for producing variable speeds; manually operable means to cause the control rod to be set to control the throttle valve to produce a constant speed; a member cooperating with the throttle control rod and normally held in a position by the fluid motor piston rod to prevent the throttle control rod from being set under control of said manual means until the fluid motor piston recedes from said member; a valve means to control the pressures in the fluid motor; a brake pedal; means intermediate the brake pedal and the valve means to control the latter to cause said member to render the manually operable means ineffective thus preventing said manually operable means from having any effect on said throttle control rod; a gear shifting means having high, second, low and neutral positions; a linkage connected to said intermediate means to control the latter; a cam device actuated by the gear shifting means when the latter is in high gear position to cause the linkage to so control the intermediate means that the latter will control said valve means upon operation of the brake pedal to reduce the constant speed; and means operated by said cam to render the intermediate means inoperative to prevent its control of the valve means, when said gear shifting means is out of high gear position.

2. A device for actuating a speed control, including a normally ineffective fluid motor powered by vacuum created pressures, said motor being rendered effective upon operation of a vehicle motor, said fluid motor including a cylinder, a piston and piston rod, said device also including a foot pedal to actuate a throttle control rod to operate a throttle valve for producing variable speeds; manually operable means to cause the control rod to be set to control the throttle valve to produce a constant speed; a member cooperating with the throttle control rod and normally held in a position by the fluid motor piston rod to prevent the throttle control rod from being set under control of said manual means until the fluid motor piston recedes from said member; a valve means to control the pressures in the fluid motor; a brake pedal; a device connected to the valve means to control the latter to cause the member to render the manually operable means ineffective, thus preventing said manually operable means from having any effect on said throttle control rod; means operated by the brake pedal to actuate said device; a gear shifting means having high, second, low and neutral positions; a linkage connected to said device to control the latter; mechanism actuated by the gear shifting means when the latter is in high gear position to cause said linkage to control said device whereby the latter will control said valve means upon operation of said brake pedal to reduce the constant speed; and means operated by said mechanism to render said device inoperative, to prevent its control of the valve means when said gear shifting means is out of high gear position.

3. In a speed control mechanism for vehicle engines having an engine throttle valve to control the engine speed, the combination of a foot throttle to control said throttle valve to cause variable engine speeds; a spring adapted to close the throttle valve; means to set the throttle valve for constant engine speed; means to automatically cause the spring to reset said throttle valve to said constant speed control upon release of the foot throttle after operation of said foot throttle to cause said engine to be driven at a higher speed than said constant speed; a brake pedal; means operated by said brake pedal to control said automatic means to cause reduction of speed of said engine below said constant speed upon operation of said brake pedal; gear shifting means having high, second, low and neutral positions; and means operable by said gear shifting means to render said automatic means inoperative to prevent its control of the throttle valve upon moving said gear shifting means out of high gear position, and for simultaneously rendering ineffective said means operated by the brake pedal to prevent said means operated by the brake pedal from controlling the automatic means.

4. A device for actuating a speed control, including a normally ineffective fluid motor powered by vacuum created pressures, said motor being rendered effective upon operation of a vehicle motor, said fluid motor including a cylinder, piston and piston rod, said device also including a foot pedal to actuate a throttle control rod to operate a throttle valve for producing variable speeds; manually operable means to cause the control rod to be set to control the throttle valve to produce a constant speed; a member cooperating with the throttle control rod and normally held in a position by the fluid motor piston rod to prevent the throttle control rod from being set under control of said manual means until the fluid motor piston recedes from said member; a valve means to control the pressures in the fluid motor; a brake pedal; means intermediate the brake pedal and the valve means to render the manually operable means ineffective, thus preventing said manually operable means from having any effect on said throttle control rod; a gear shifting means having high, second, low and neutral positions; a linkage connected to said intermediate means to control the latter; a cam device actuated by the gear shifting means when the latter is in high gear position to cause the linkage to so control the intermediate means that the latter will control said valve means upon operation of the brake pedal to reduce the constant speed; means operated by said cam to render the intermediate means inoperative, to prevent its control of the valve means, when said gear shifting means is out of high gear position; and a second manually operable means to so control said valve that when the brake pedal is operated said valve automatically cuts off all of the above controls which cause constant speed and which reduces the speed from said constant speed.

5. A device for actuating a speed control, including a normally ineffective fluid motor powered by vacuum created pressures, said motor being rendered effective upon operation of a vehicle motor, said fluid motor including a cylinder, a piston and piston rod, said device also including a foot pedal to actuate a throttle control rod to operate a throttle valve for producing variable speeds; manually operable means to cause the control rod to be set to control the throttle valve to produce a constant speed; a member cooperating with the throttle control rod and normally held in a position by the fluid motor piston rod to prevent the throttle control rod from being set under control of said manual means until the fluid motor piston recedes from said member.

6. A device for actuating a speed control, including a normally ineffective fluid motor powered by vacuum created pressures, said motor being rendered effective upon operation of a vehicle motor, said fluid motor including a cylinder, a piston and piston rod, said device also including a foot pedal to actuate a throttle control rod to operate a throttle control valve for producing variable speeds; manually operable means to cause the control rod to be set to control the throttle valve to produce a constant speed; a member cooperating with the throttle control rod and normally held in a position by the fluid motor piston rod to prevent the throttle control rod from being set under control of said manual means until the fluid motor piston recedes from said member; a valve means to control the pressures in the fluid motor; a brake pedal; means intermediate the brake pedal and the valve means to control the latter to cause said member to render the manually operable means ineffective, thus preventing said manually operable means from having any effect on said throttle control rod.

7. In a speed control mechanism for vehicle engines, having an engine throttle valve to control the engine speed, the combination of a foot throttle to control said throttle valve for variable engine speeds; resilient means adapted to close the throttle valve; manually operable means to set the throttle valve for constant engine speed control; automatic means intermediate said foot throttle and said manually operable means to cause the resilient means to reset said throttle valve to said constant engine speed control upon release of the foot throttle after operation of said foot throttle to cause increase of engine speed above said constant engine speed; a brake pedal; means controlled by said brake pedal to control said automatic means to reduce the engine speed below said constant engine speed upon operation of said brake pedal; gear shifting means having high, second, low, reverse and neutral positions; and means controlled by said gear shifting means to render said automatic means inoperative to prevent its control of the throttle valve when said gear shifting means is out of its high gear position and to render the means controlled by said brake pedal inoperative thus preventing said brake pedal controlled means from having any effect upon the throttle valve.

8. In a speed control mechanism for vehicle engines, having a throttle valve to control the engine speeds, the combination of a foot throttle to control said throttle valve for variable engine speeds; a spring adapted to close the throttle valve; means to control said throttle valve for constant engine speed; means to automatically control the throttle valve control means to automatically cause the engine to assume said constant speed under action of said spring upon release of the foot throttle after the engine has been operated at a higher speed under control of said foot throttle; gear shifting means having high, second and low speed positions; and means intermediate the first mentioned means and said gear shifting means and controlled by the latter to render the automatic means positively inoperative to prevent any automatic control of the throttle valve when the gear shift is out of high gear position.

9. In a speed control mechanism for vehicle engines, having a throttle valve to control the engine speeds, the combination of a foot throttle to control said throttle valve for variable engine speeds; resilient means adapted to close the throttle valve; a device to set the throttle valve for constant engine speed control; manual means to control said device; automatic means to control said device to cause it to be reset to its constant speed control position by said resilient means after said engine has been operated at a greater speed by said foot throttle and upon release of said foot throttle; gear shifting means having high, second and low gear positions; and a member to render said automatic means inoperative to prevent its control of said device upon movement of the gear shifting means out of its high gear position.

10. In a speed control mechanism for vehicle engines, having a throttle valve to control the engine speed, the combination of a foot throttle to control said throttle valve for variable engine speeds; means to restore the throttle valve; a device to set said throttle valve for constant engine speed; manual means to control said device; a brake pedal; means operated thereby to control said device to reduce the engine speed; automatic means to reset said device to its constant engine speed control position after release of the brake pedal, and to reduce the engine speed to its constant set speed after said engine has been operated at a higher speed by said foot throttle; gear shifting means having high, second, and low gear positions; and means intermediate said automatic means and said gear shifting means and controlled by the latter to render the entire automatic means inoperative to prevent any automatic control of said device upon movement of said gear shifting means out of its high gear position.

11. In a speed control mechanism for vehicle engines, having a throttle valve to control the engine speeds, the combination of a foot throttle to control the throttle valve for variable engine speeds; a spring adapted to close the throttle valve; manually operable means to set said throttle valve for constant engine speed control; means intermediate the foot throttle and the manually operable means to automatically cause the spring to reset said throttle valve to said constant engine speed control after operation of said foot throttle to cause increase of the engine speed above said constant speed upon release of the foot throttle; a brake pedal; means controlled by said brake pedal to reduce the speed of the engine below said constant engine speed upon operation of the brake pedal; a second manually operable means; and means controlled thereby to render said intermediate means wholly inoperative thus preventing all automatic controls from functioning.

12. In a speed control mechanism for vehicle engines, having an engine throttle valve, the combination of a foot throttle to control said throttle valve for variable engine speeds; a spring adapted to close the throttle valve; manually operable means to set said throttle valve for constant engine speed control; means intermediate the foot throttle and the manually operable means to automatically reset the throttle valve to said constant speed control from a lower engine speed and cause the spring to reset the throttle valve to the constant engine speed control from a higher engine speed; a brake pedal; means controlled thereby to reduce the speed of the engine below the constant engine speed by actuating said intermediate means; a second manually operable means; and means intermediate the latter and said first intermediate means and controlled by said second manually operable means to render said first intermediate means wholly inoperative to prevent operation of all automatic controls after said first intermediate means has been actuated by said brake pedal.

GEORGE T. LEIHGEBER.

REFERENCES CITED

The following references are of record in the file of this patent:

UNITED STATES PATENTS

| Number | Name | Date |
|---|---|---|
| 1,620,764 | Hull | Mar. 15, 1927 |
| 1,897,358 | Bellis | Feb. 14, 1933 |
| 2,100,225 | Stein | Nov. 23, 1937 |
| 2,116,556 | Bellis | May 10, 1938 |
| 2,204,265 | Wentzel | June 11, 1940 |
| 2,216,138 | Sellers | Oct. 1, 1940 |
| 2,230,742 | Bush | Feb. 4, 1941 |
| 2,302,085 | Wolfe et al. | Nov. 17, 1942 |
| 2,362,655 | Mallory | Nov. 14, 1944 |
| 2,443,084 | Rhodes | June 8, 1948 |